(12) United States Patent
Morris (10) Patent No.: US 11,084,500 B2
(45) Date of Patent: Aug. 10, 2021

(54) VEHICLE CONTROL SYSTEM

(71) Applicant: Westinghouse Air Brake Technologies Corporation, Wilmerding, PA (US)

(72) Inventor: Irwin C. Morris, Cedar Rapids, IA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 0 days.

(21) Appl. No.: 16/704,340

(22) Filed: Dec. 5, 2019

(65) Prior Publication Data

US 2021/0171054 A1  Jun. 10, 2021

(51) Int. Cl.

| | |
|---|---|
| *B60W 50/12* | (2012.01) |
| *B60W 40/08* | (2012.01) |
| *B60W 50/14* | (2020.01) |
| *G08B 21/22* | (2006.01) |
| *B60W 30/18* | (2012.01) |
| *G06Q 10/10* | (2012.01) |

(52) U.S. Cl.
CPC .......... *B60W 50/12* (2013.01); *B60W 30/181* (2013.01); *B60W 40/08* (2013.01); *B60W 50/14* (2013.01); *G06Q 10/1091* (2013.01); *B60W 2050/146* (2013.01)

(58) Field of Classification Search
CPC .................................................. G05D 1/0088
See application file for complete search history.

(56) References Cited

U.S. PATENT DOCUMENTS

| | | | |
|---|---|---|---|
| 2006/0232131 A1* | 10/2006 | Endo | B60R 25/042 307/10.2 |
| 2011/0015809 A1* | 1/2011 | Hermann | H04Q 9/00 701/2 |
| 2014/0303826 A1* | 10/2014 | Kobayashi | B60L 15/2045 701/22 |
| 2015/0227890 A1* | 8/2015 | Bednarek | G06Q 30/0635 705/26.81 |
| 2018/0341895 A1* | 11/2018 | Kislovskiy | G06Q 10/04 |
| 2018/0356814 A1* | 12/2018 | Brooks | A61B 5/11 |
| 2019/0172170 A1* | 6/2019 | Jabour | G06Q 30/0645 |
| 2019/0235499 A1* | 8/2019 | Kazemi | B60W 30/0956 |
| 2019/0303689 A1* | 10/2019 | Ghannam | B60T 7/22 |

* cited by examiner

*Primary Examiner* — Joseph H Feild
*Assistant Examiner* — Pameshanand Mahase
(74) *Attorney, Agent, or Firm* — The Small Patent Law Group LLC; Philip S. Hof (57) ABSTRACT

A system includes one or more processors configured to track working hours of one or more members of a crew that operates a vehicle system. The working hours accumulate as the vehicle system travels on a route. The one or more processors are configured to direct a display device to present a notification message that indicates an amount of time remaining until the working hours reach a prescribed service limit for a designated time interval. The one or more processors are configured to automatically control the vehicle system to one or more of stop movement of the vehicle system, slow movement of the vehicle system, or prevent movement of the vehicle system from a stationary position responsive to determining that the working hours of the one or more members of the crew exceed the prescribed service limit.

20 Claims, 4 Drawing Sheets

VEHICLE CONTROL SYSTEM

BACKGROUND

Technical Field

The subject matter describes embodiments relating to controlling vehicle systems.

Discussion of Art

Various transportation-related industries have established regulations that designate limits corresponding to the amount of time that crew members or operators can operate vehicle systems during a given time period, such a day or a week. For example, a truck driver may be subject to a restriction that limits the number of contiguous hours that the driver can operate a truck before taking a break. The regulations may be established for safety reasons to reduce the risk of accidents, injury, damage, or other harm that is caused, at least in part, by fatigue or drowsiness of the operator or crew. If an operator or crew reaches a prescribed limit in the hours worked during a trip of a vehicle system, that operator or crew may need to be replaced before the vehicle system can continue traveling.

Some known systems require the operators or crew members to self-monitor and/or self-report the hours worked. For example, a train engineer may be tasked with tracking his or her time spent onboard each vehicle system during a designated time interval and communicating the times to an offboard location, such as a dispatch or back office. The manual monitoring can be inaccurate. For example, a crew member may intentionally or unintentionally misreport the hours worked. An immediate risk associated with self-monitoring is the ability for the crew member to exceed a prescribed service limit and keep working while the crew member is in a physically diminished condition due to fatigue and drowsiness. Furthermore, the operator or crew member may forget to communicate updates to the offboard location, resulting in omitted information. If the offboard location receives inaccurate hours of service information and/or fails to receive the hours of service information, the offboard location may not be able to accurately coordinate a replacement operator and/or crew to replace the operator and/or crew that reaches the service limit. The vehicle system may remain parked for an extended period of time as the replacement operator and/or crew seeks the vehicle system, which increases the travel time and reduces the network throughput. It may be desirable to have a system and method that differs from those that are currently available.

BRIEF DESCRIPTION

In one embodiment, a system (e.g., a vehicle control system) is provided that includes one or more processors configured to track working hours of one or more members of a crew that operates a vehicle system. The working hours accumulate as the vehicle system travels on a route. The one or more processors are configured to direct a display device to present a notification message that indicates an amount of time remaining until the working hours reach a prescribed service limit for a designated time interval. The one or more processors are configured to automatically control the vehicle system to one or more of stop movement of the vehicle system, slow movement of the vehicle system, or prevent movement of the vehicle system from a stationary position responsive to determining that the working hours of the one or more members of the crew exceed the prescribed service limit.

In one embodiment, a method (e.g., for monitoring crew hours) is provided that includes tracking working hours of one or more members of a crew that operates a vehicle system, and the working hours accumulate as the vehicle system travels on a route. The method includes displaying, on a display device, a notification message that indicates an amount of time remaining until the working hours reach a prescribed service limit for a designated time interval. The method includes controlling the vehicle system responsive to determining that the working hours of the one or more members of the crew exceed the prescribed service limit to one or more of stop movement of the vehicle system, slow movement of the vehicle system, or prevent movement of the vehicle system from a stationary position.

In one embodiment, a system (e.g., a vehicle control system) is provided that includes one or more processors that may track working hours of one or more members of a crew that operates the vehicle system. The working hours accumulate as the vehicle system travels on a route. The one or more processors may direct a display device to present a notification message that indicates an amount of time remaining until the working hours reach a prescribed service limit for a designated time interval. The one or more processors may determine a suggested stopping location at which to stop the vehicle system and to direct the display device to present the suggested stopping location. The suggested stopping location is an upcoming location along the route in a direction of travel of the vehicle system, and the vehicle system is expected to reach the suggested stopping location prior to the working hours exceeding the prescribed service limit. The suggested stopping location is spaced apart from intersections between the route and other routes.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that track hours worked by crews that operate vehicle systems and compare the hours worked to prescribed service limits to ensure that the crews are alert when operating the vehicle systems. The system tracks working hours of crew members within designated time intervals, such as a day (e.g., 24 hours) or a week (e.g., 168 hours). The system monitors the working hours of each individual crew member and can track the working hours as the crew member switches between different vehicle systems. The system provides accurate, automated tracking of the working hours without requiring crew members to collect and report manual records of the hours worked. The system notifies the crew regarding an amount of time remaining until the working hours reach a prescribed service limit. The notification may be in the form of an indication. The indication may provide the crew with an ability to control the vehicle system based at least in part on the upcoming service limit. Furthermore, by tracking the working hours relative to the prescribed service limits, the system can determine when a replacement crew should be dispatched to replace one or more crew members of the crew to avoid a long delay for crew switchover. Suitable indications may include a message displayed on a display device that is visible to the crew, a symbol, a color status, a countdown timer, a patterned light signal, combinations of the foregoing, and the like. In one embodiment, the indication may be sub-divided to indicate each crew member individually, as each crew member may have a different criterion for calculating remaining service hours.

The prescribed service limits may ensure that crew members are rested and alert while on duty operating the vehicle system. If the working hours of at least one crew member exceeds a prescribed service limit while onboard or operating the vehicle system, the crew member(s) in violation of the prescribed service limit may experience fatigue or drowsiness, which could slow reaction times and compromise critical thinking. In one or more embodiments, the system can enforce the prescribed service limits by taking actions to prevent or limit the ability of a crew member to intentionally or unintentionally violate the prescribed service limit. For example, in response to determining that the working hours of at least one member of a crew exceed a prescribed service limit, the system can take full or partial control of the vehicle system. In taking at least partial control of the vehicle system, the system restricts the ability of the crew, which might be experiencing fatigue or drowsiness, to control the movement of the vehicle system in order to reduce the risk of accidents, injuries, and/or damage.

The systems and methods described herein can be used with various types of vehicle systems, such as rail vehicles (e.g., rail trains), trucks, buses, mining vehicles, marine vessels, aircraft, agricultural vehicles, automobiles, or the like. The vehicle systems can be equipped with an onboard controller or control system that may take automated control of the vehicle system, such as by applying brakes to slow or stop movement of the vehicle system. The crew refers to one or more persons tasked with operating the vehicle system as the vehicle system moves along a route. For example, the crew can represent a single operator that drives a truck. In another example, the crew can represent a team of members or operators that work onboard a rail train to control the movement of the rail train.

Figure 1:
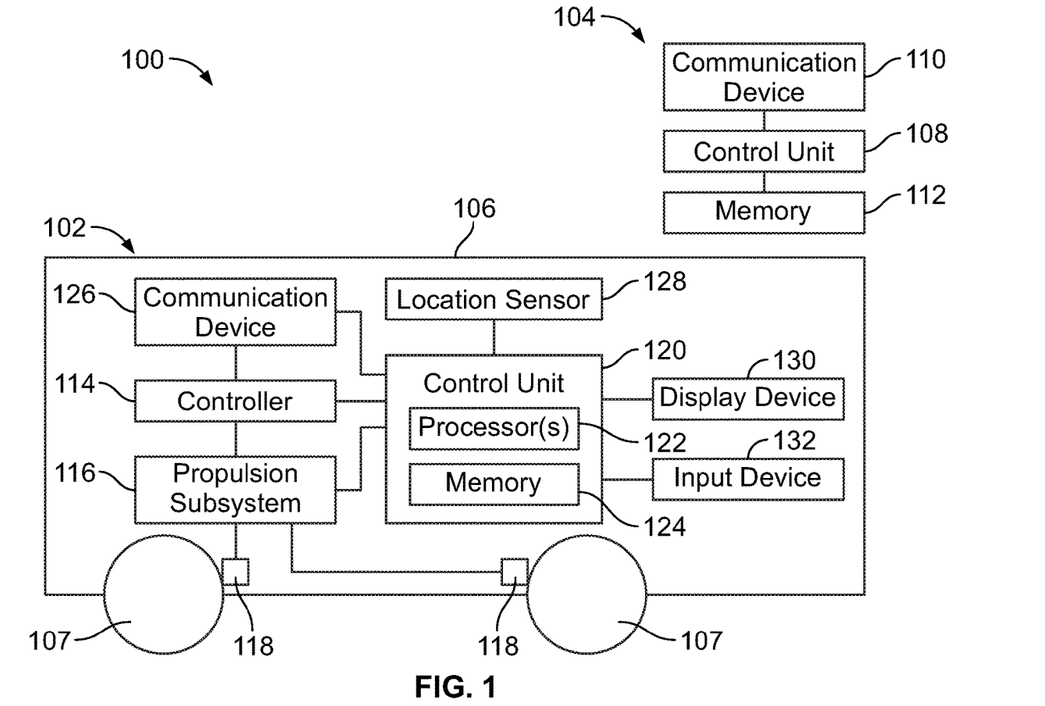
FIG. 1 is a schematic diagram of a vehicle control system according to an embodiment.

FIG. 1 is a schematic diagram of a vehicle control system 100 according to an embodiment. The vehicle control system may both track the working hours of one or more members of a crew with respect to one or more prescribed service limits and enforce the prescribed service limits. The vehicle control system includes a vehicle system 102 and an off-board location 104. The vehicle system can communicate with the off-board location as the vehicle system travels along a route. The communications between the vehicle system and the off-board location enable the vehicle control system to track the working hours of the crew that operates the vehicle system.

The vehicle system 102 includes at least one vehicle 106. Although only the single vehicle is shown in FIG. 1, the vehicle system optionally may include multiple vehicles that collectively represent the vehicle system. The vehicle 106 is shown as a land-based vehicle. Suitable land-based vehicles may include a rail vehicle (e.g., a locomotive), a mining vehicle, a road-based truck, an automobile, a bus, an agricultural vehicle, or the like. The vehicle includes wheels 107 that roll on a route, such as a street, path, or track, as the vehicle travels along the route. The vehicle system may include different types of vehicles in other embodiments, such as water-based vehicles that travel through waterways. In one example, the vehicle may represent a vehicle that may mechanically couple to a plurality of non-propulsion vehicles, such as a locomotive coupled to rail cars to form a train. In another example, the vehicle system can include multiple vehicles that are communicatively connected together but are not mechanically coupled. That is, the vehicles in the vehicle system are mechanically separate from each other. The vehicles can communicate with each other to travel with coordinated movements along routes to travel together as a vehicle system (e.g., as a convoy, platoon, or swarm).

The vehicle system may be operated by a crew that controls and/or supervises movements of the vehicle system. The crew includes one or more crew members or operators. Non-limiting examples of crew members include engineers, operators, drivers, pilots, etc. In an embodiment, all or at least some of the crew members ride onboard the vehicle system as the vehicle system travels on a route. In an alternative embodiment, the crew may remotely control the vehicle system without riding onboard the vehicle system. The vehicle control system described herein may track working hours of the crew. Working hours, which are referred to as hours of service, refer to time spent by the crew operating vehicle systems. As described above, various industries and companies provide express restrictions on the number of working hours that crew members can log within designated time intervals in an effort to avoid fatigue and drowsiness of crew members that operate vehicle systems. The designated time intervals can be hourly, daily, weekly, or the like.

The off-board location may be a centralized location, such as a dispatch facility, command center, or back office, that communicates with multiple vehicle systems in a transportation network. An off-board network management control system 108 is disposed at the off-board location. The network management control system is operably connected to a communication device 110 and a tangible and non-transitory computer-readable storage medium (e.g., memory) 112, which are both at the off-board location.

The off-board network management control system can represent hardware circuitry that includes and/or is connected with one or more processors that can perform at least some of the vehicle control operations described herein. The network management control unit can be or include a back-office server of a positive control system in one embodiment. Alternatively, the off-board control unit can be another system that monitors movements of the vehicles to ensure safe travel of the vehicles. The memory at the off-board location can store information relevant to tracking the working hours of the crew, such as a database the includes identification information relating to the crew members, previously-accrued (or logged) working hours of the crew members prior to a current trip of the crew members on the vehicle system, and/or an updated running total of the working hours of the crew members factoring in the current trip of the crew members. The memory may store other information, such as the locations of the vehicle system shown in FIG. 1 and other vehicle systems in a network, trip schedules, crew schedules, and/or the like. The crew schedules may include information about available crew members to replace the crew that currently operates the vehicle system.

The communication device at the off-board location can represent circuitry that can communicate electrical signals wirelessly and/or via wired connections. For example, the communication device can represent transceiving circuitry, one or more antennas, modems, or the like. The transceiving circuitry may include a transceiver or separate transmitter and receiver devices. The electrical signals can form data packets that in the aggregate represent messages. In various embodiments, the network management control unit can generate messages that are communicated remotely by the communication device. The communication device can receive messages and forward the messages to the network management control unit for analysis of the received messages.

The vehicle includes a vehicle controller 114 that controls movement and other operations of the vehicle. The controller includes one or more processors and controls a propulsion subsystem 116 of the vehicle. The propulsion subsystem includes one or more engines, motors, and associated components for generating tractive effort to rotate the wheels. The propulsion subsystem further includes one or more brakes 118 and associated components for providing braking effort to slow and stop the vehicle. The brakes may include or represent friction brakes, air brakes, regenerative brakes, and/or the like.

The vehicle includes a control unit 120 (e.g., an onboard control unit) that performs at least some of the vehicle control operations described herein. The onboard control unit represents hardware circuitry that includes and/or is connected with one or more processors 122 (e.g., one or more microprocessors, integrated circuits, microcontrollers, field programmable gate arrays, etc.). The onboard control unit includes and/or is connected with a tangible and non-transitory computer-readable storage medium (e.g., memory) 124 disposed onboard the vehicle.

The onboard control unit communicates with the off-board control unit for monitoring the working hours of the crew and enforcing service limits by controlling where and/or when the vehicle can move. For example, the onboard control unit can automatically apply brakes of the vehicle to slow or stop the vehicle based on determining that a service limit is exceeded. In one embodiment, the onboard control unit is an onboard component of a positive control system that limits where and when the vehicle can move based on movement authorities, locations of other vehicles, or the like. For example, the positive control system may require receipt of a permission signal from an off-board source, such as the off-board control unit, prior to releasing the brakes of the vehicle system or otherwise allowing movement of the vehicle system along the route. The default action is to remain stationary until a permission signal is received. In another embodiment, the onboard control unit can be an onboard component of a different type of positive control system, a negative control system, a manual control system, or the like. In a negative control system, the vehicle system as a default is allowed to move and the vehicle system is only restricted from moving in response to receiving a signal prohibiting movement.

A communication device 126 onboard the vehicle can be used to remotely communicate information, such as with the off-board location. The onboard communication device can include some or all of the same components of the communication device at the off-board location. The onboard control unit can communicate with the off-board network management control unit via the onboard communication device. For example, the onboard communication device can wirelessly transmit messages to the communication device at the off-board location and can receive messages transmitted by the off-board communication device. The communicated messages may be related to tracking the working hours of the crew.

The vehicle includes a display device 130 and an input device 132. The display device includes a display screen that may display a graphical user interface. The graphical user interface presents information to the crew onboard the vehicle, such as the current location of the vehicle, a map, vehicle parameters (e.g., speed, fuel level, etc.), and the like. The graphical user interface may display notification messages related to the working hours of the crew. The input device may include a touchpad, a touchscreen, a keyboard, a mouse, physical buttons, a joystick, or the like. The input device enables the crew to provide manual inputs, such as commands, to the vehicle. In a non-limiting example, a crew member can use the input device to select virtual buttons on the graphical user interface, such as to clear notification messages and/or to generate requests for extending travel beyond a prescribed service limit. Optionally, the input and display devices may be integrated together within a unitary device, such as a laptop computer, a desktop computer, a workstation, a tablet computer, a handheld computing device (e.g., smartphone), a wearable computing device (e.g., smartwatch), or the like. The onboard control unit is operably connected to the display device and the input device via one or more wired or wireless communication pathways.

The vehicle may include a location sensor 128 that determines the location of the vehicle. The location may refer to an absolute location based on global coordinates or a relative location based on a reference point. The location sensor can represent a global positioning system receiver, a wireless triangulation system, or the like. The onboard control unit can utilize location data generated by the location sensor to estimate a geographic location of the vehicle at a future time that the working hours of the crew reach a prescribed service limit.

In an embodiment, the vehicle control system tracks the working hours of the crew by first determining how many working hours have already accrued within each of one or more designated time intervals. The designated time intervals may represent 24 hours, 48 hours, 72 hours, 168 hours (e.g., one week), and/or the like. Because the crew may operate different vehicle systems within any given time interval, the crew may have accrued working hours prior to commencing operation of the vehicle system shown in FIG. 1. The accrued working hours can be specific to each member of the crew, which allows for changes in crew makeup within a designated time interval without interfering with the tracking process.

In an embodiment, the onboard control unit can receive the previously-accrued working hours of the crew. First, the onboard control unit may identify the crew, including the identities of the one or more crew members. The crew identity may be determined by receiving log-in information manually submitted by the crew members using the onboard input device. The log in process may involve the crew members providing user identification and security information. Once validated, the vehicle controller can allow the crew to operate the vehicle system, such as by inputting or modifying tractive settings or brake settings. Alternatively, the crew identification may be determined based on a trip itinerary.

The onboard control unit may communicate, via the onboard communication device, a message that includes the crew identification information to the off-board location. In response, the off-board network management control unit may access a database of accrued working hours within the memory at the off-board location. The network management control unit may pull records of any working hours already accrued by the members identified in the crew. The members within the same crew may have different amounts of previously-accrued working hours. For example, the database may indicate that one specific crew member has accrued five working hours within the previous 24 hours and 35 working hours within the previous week. The database may indicate that another member of the crew has accrued two working hours within the previous 24 hours and 30 working hours within the previous week. The network management control unit may generate a crew information message that includes the previously-accrued working hours for each of the identified crew members. The crew information message can be transmitted to the onboard control unit via the communication devices. In an alternative embodiment, the onboard control unit can receive the previously-accrued working hours of the crew from a trip itinerary or by manual entry during the log-in process described above, and the control unit does not request the off-board location to communicate the previously-accrued working hours.

In addition to receiving the previously-accrued working hours of the crew, the onboard control unit determines a time that the crew commences operation of the vehicle system. The time at which the crew commences operation of the vehicle system starts the clock for the accrual of new working hours. The onboard control unit may receive a signal that the crew has commenced operation of the vehicle system and can designated the time at which the signal is received as the time that the crew commences operation. The signal can be generated when the crew members log into the vehicle using the input device. Optionally, the signal can be generated by a proximity sensor or RFID reader that determines that the crew members are onboard the vehicle.

The working hours for each crew member are calculated by adding the previously-accrued working hours of the crew member to an amount of time that has elapsed from the time that the crew member (or crew) commenced operation of the vehicle system. For example, if the previously-accrued working hours for a first crew member are three hours in the last 24 hours and the crew member commenced operation of the vehicle system (e.g., logged into the vehicle to begin work) at 11 a.m., then at 2 p.m. in the afternoon the working hours for the first crew member are determined to be six hours. The six hours are calculated by adding the three previously-accrued working hours to the three hours that have elapsed from the time the clock started at 11 a.m. to the current time 2 p.m. The working hours accumulate as the first crew member operates the vehicle system. The working hours accumulate for all crew members as the vehicle system travels on a route with the crew onboard. For example, at 3 p.m. the working hours will be seven hours.

The onboard control unit can determine a time that the crew ceases operation of the vehicle system. The crew may cease operation when the vehicle system completes a trip and/or the crew is replaced by another crew that will operate the vehicle system. The onboard control unit can determine the time that the crew ceases operation by receiving another signal, such as a signal indicating that the crew members have logged out using the input device and/or a signal indicating that the crew members are not proximate to the vehicle system. In response to the crew ceasing operation of the vehicle system, the vehicle control system tolls the clock such that the working hours stop accruing. The vehicle control system can calculate the working hours for each crew member, which is now a fixed number. For example, if the crew ceases operation of the vehicle system at 3 p.m., according to the hypothetical example, above the onboard control unit can generate a message that indicates that the first crew member has seven working hours within the previous 24 hour time interval. The onboard control unit can store the updated working hours locally in the onboard memory and/or communicate the updated working hours to the off-board network management control unit via the communication device. Optionally, the vehicle control system may toll the clock (e.g., postpone the accrual of working hours) prior to the crew ceasing operation of the vehicle system, such as during rest breaks.

Figure 2:
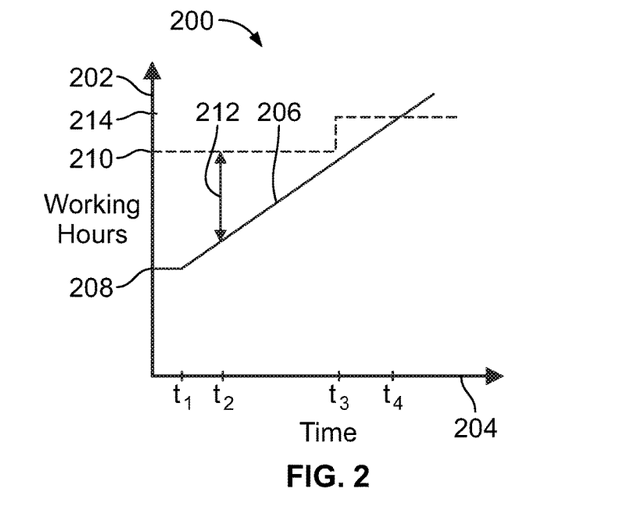
FIG. 2 is a graph showing the accrual of working hours over time according to an embodiment of the vehicle control system.

With continued reference to FIG. 1, FIG. 2 is a graph 200 showing the accrual of working hours over time according to an embodiment of the vehicle control system. The vertical axis 202 of the graph represents the working hours, and the horizontal axis 204 represents time. The graph has a single plot line 206, which can represent the working hours of a single crew member, such as the first crew member described in the hypothetical above. Although only the working hours of a single member are graphed, the vehicle control system may simultaneously track the working hours of multiple crew members. Alternatively, the plot line in FIG. 2 can be a function of the working hours of multiple crew members. For example, the plot line can represent an average or median value of the working hours of the crew members.

The graph includes a prescribed service limit 210 for a designated time interval. The prescribed service limit represents a ceiling or maximum number of working hours permitted within the designated time interval. The prescribed service limit may be based on a government regulation, an industry regulation, a company rule, or the like. In a non-limiting example, the prescribed service limit may dictate that operators are not permitted to operate a vehicle system longer than 12 hours within a 24-hour (e.g., daily) time interval. In another example, the prescribed service limit may dictate that operators are not permitted to operate a vehicle system longer than 70 hours within a 168-hour (e.g., weekly) time interval. The graph shown in FIG. 2 is qualitative, not quantitative, and can represent any prescribed service limit for a designated time interval.

The time $t_1$ represents the time that the corresponding crew or crew member commences operation of the vehicle system. The working hours begin at a non-zero amount 208, which represents the previously-accrued working hours within the designated time interval. After time $t_1$, the working hours accrue and accumulate as the amount of elapsed time increases. The working hours can accrue as the vehicle system travels along a route under the direct control or at least supervision of the crew. The crew may travel onboard the vehicle system.

The vehicle control system monitors the amount of time remaining until the working hours reach the prescribed service limit by subtracting the working hours from the prescribed service limit. For example, at time $t_2$ shown in FIG. 2, the difference between the prescribed service limit and the working hours is the amount of time 212. The amount of time remaining until the working hours reach the prescribed service limit gradually decreases from time $t_1$ to time $t_3$ in FIG. 2.

Figure 3:
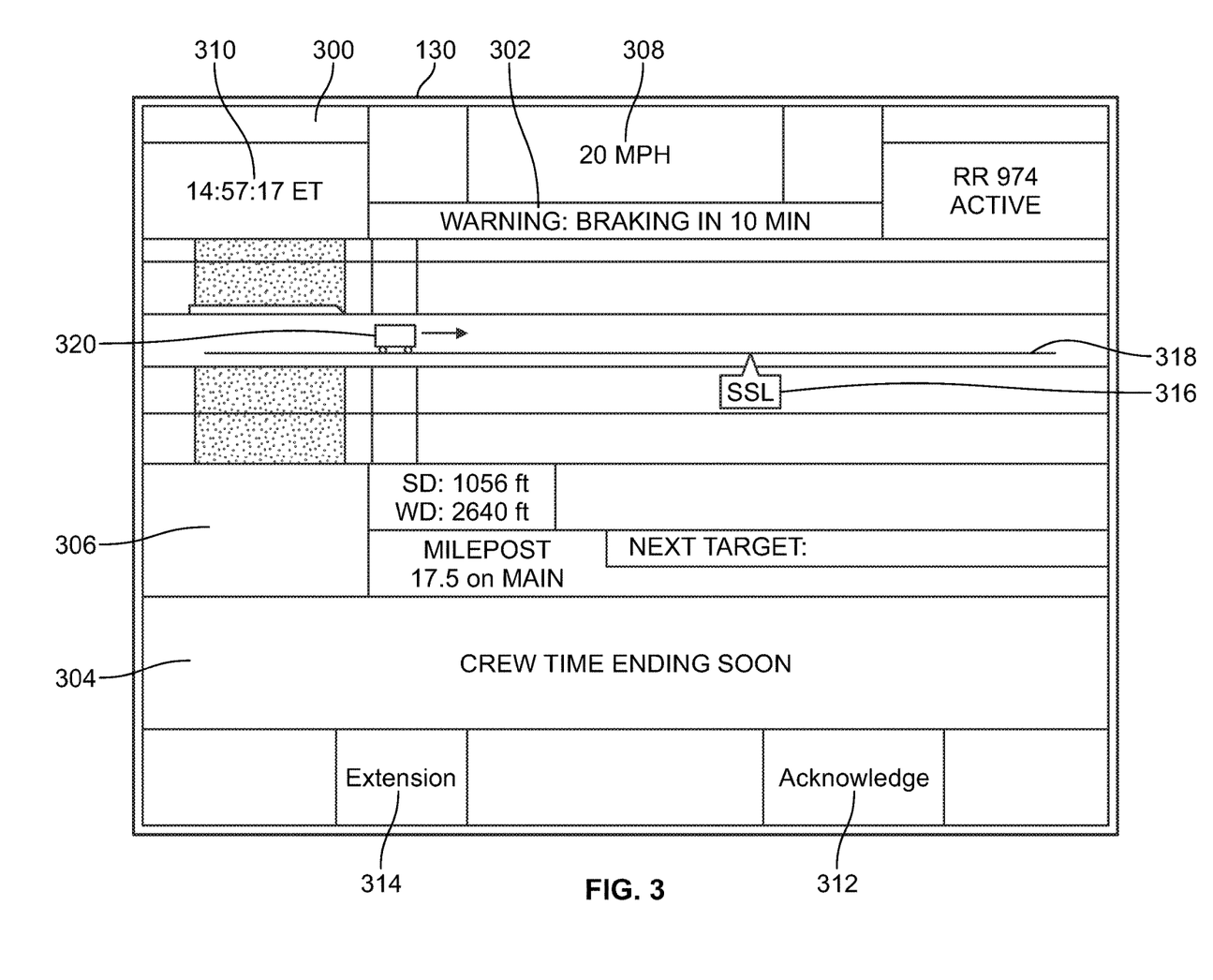
FIG. 3 illustrates a first example notification message on the display device.

The vehicle control system according to an embodiment presents a notification message on the onboard display device. The notification message is provided to alert and notify the crew about the amount of time remaining until the working hours of one or more crew members reaches a prescribed service limit. An example notification message 300 on the display device is shown in FIG. 3. The notification message provides the amount of time remaining until the working hours reach a prescribed service limit. For example, the notification message includes a text-based message 302 that states "Warning: Braking In 10 Min," indicating that there is only ten minutes remaining until the working hours reach the prescribed service limit. The message may update periodically, such as every minute, to reflect the updated amount of time until the prescribed service limit is reached. Alternatively, the amount of time remaining may be continuously updated every second, such that the amount of time is displayed as a running clock counting down to zero. The notification message optionally includes a message 304 stating "Crew Time Ending Soon."

The notification message can be overlaid or superimposed on a graphical user interface 306 displayed on the display device. The graphical user interface 306 can provide additional information concurrent with the notification message, such as a current speed 308 of the vehicle system, a current time 310 in the relevant time zone, and other information indicating progress of the vehicle system along a trip or scheduled route. The graphical user interface can provide a virtual acknowledgement button 312 that allows the operator to select for the display device to cease displaying the notification message. For example, the acknowledgement button can state "Acknowledge," "OK," "Close Notification," or the like. The operator can select the virtual button via a user touch input on a touchscreen or via the use of a physical button, a mouse, a joystick, or the like. Upon selection of the acknowledgement button, the graphical user interface can remove the text-based messages from the display, at least temporarily until the notification message is re-presented. The notification message may be presented with additional stimuli, such as an audio alert (e.g., a beep), flashing lights, vibration, or the like, to draw the attention of the crew members to the notification message.

The onboard control unit may periodically provide status updates to the off-board network management control unit. Each status update may include the current (up-to-date) working hours for the crew and/or the amount of time remaining until the working hours reach the prescribed service limit. The status updates may be communicated in the form of messages from the onboard communication device to the communication device at the off-board location. The updates may be stored, at least temporarily in the memory at the off-board location. The network management control unit can receive status updates from multiple different vehicle systems to monitor the crew hours of each of the vehicle systems. The network management control unit can utilize the information in the status updates to organize, schedule, and dispatch replacement crews. For example, if a status update indicates that there is 30 minutes remaining until the working hours of a crew on a given vehicle system reach a prescribed service limit, the network management control unit can organize and dispatch a replacement crew to meet up with the vehicle system prior to, at, or soon after the working hours reach the prescribed service limit. The crews can then switch to enable the vehicle system to continue traveling as scheduled without violating the service limit and without tolerating a long delay for the crew change.

Although the working hours accrue at a constant rate beyond time $t_1$ in FIG. 2, the vehicle control system may vary the accrual of working hours based on factors such as intensity of the crew activity, breaks, and/or autonomous travel modes. For example, the vehicle control system may toll the clock or reduce the weighted value of time spent in which the crew is not actively operating the vehicle system. For example, the onboard control unit can receive a signal indicating when the vehicle system is in an autonomous travel mode (e.g., auto-pilot) and when the vehicle system is in manual travel mode under the direct control and supervision of the crew. For calculating the working hours, the vehicle control system may weigh the time spent during the autonomous travel mode less than the time spent during the manual travel mode. For example, every hour in which the vehicle system autonomously travels may count as only 0.5 working hour. Furthermore, the vehicle control system may weight some particularly strenuous activities, such as physically-demanding tasks, greater than the actual time spent. For example, an hour of manually releasing air brakes may be counted as 1.5 working hours.

In FIG. 2, the working hours approach the prescribed service limit around time $t_3$. In an embodiment, if the working hours reach the prescribed service limit, the vehicle control system may take remedial or responsive actions. The actions include automatically controlling the vehicle system and restricting manual control of the vehicle system. The vehicle control system may accommodate travel extensions. For example, prior to the working hours reaching the prescribed service limit, the crew operating the vehicle system can request an extension of travel. The extension of travel petitions for an extension of time to enable the crew to continue operating the vehicle system for a designated time period beyond the prescribed service limit.

The graphical user interface shown in FIG. 3 includes a virtual travel extension button 314, which optionally states the word "Extension" or a similar term or phrase. In an embodiment, a crew member may select the travel extension button 314 to request a travel extension. In response to receiving the selection, the onboard control unit may generate an extension request message that is communicated, by the onboard communication device, to the off-board location. The extension request message may identify the vehicle system, the crew or member thereof submitting the request, and optionally may designate an amount of time or distance that is sought beyond the current allotment. For example, the request may seek five minutes of extended travel beyond the time that the working hours reach the prescribed service limit. Optionally, selecting the travel extension button can generate another display page on the display device, which provides predefined options for selection by the crew member. The options may include different amounts of time, such as a five minute extension, a ten minute extension, or a fifteen minute extension.

Upon receipt of the request for extended travel, the network management control unit may analyze the request with or without input from a human operator at the off-board location. The network management control unit generates a response message that indicates whether or not the request is granted, and the response message is communicated by the off-board communication device to the vehicle. A response message that grants the request can be referred to as an extended travel authority. The extended travel authority may be granted to enable the vehicle system to travel to a designated stopping location, even though the vehicle system is not expected to arrive at the designated stopping location before the working hours reach the prescribed service limit.

In FIG. 2, an extended travel authority is received at or around time $t_3$. The extended travel authority may provide a designated time period, such as ten minutes, beyond the prescribed service limit. The onboard control unit can add the designated time period to the prescribed service limit to determine an updated service limit 214. For example, if the prescribed service limit is 12 hours (e.g., in a 24-hour interval) and the designated time period or extension is 10 minutes, then the updated service limit represents 12 hours and 10 minutes. The updated service limit is established in FIG. 2 at time $t_3$ and is depicted as a step up from the prescribed service limit. Once the updated service limit is established, the vehicle control system treats the updated service limit as the new prescribed service limit, essentially ignoring the original prescribed service limit. For example, in FIG. 2, the working hours surpass the original prescribed service limit soon after time $t_3$ but no responsive action is taken because the working hours are less than the updated service limit. The onboard control unit delays automatically controlling the vehicle system for the designated amount of time (e.g., 5 minutes, 10 minutes, or the like) beyond the time that the working hours reach the prescribed service limit.

The onboard control unit can direct the display device to present another notification message to the crew. The notification message provides an indication regarding (e.g., indicates) an amount of time remaining until the working hours reach the updated service limit. The notification message may indicate to the crew that the extended travel authority is received. For example, the notification message may display a message stating that the amount of time remaining incorporates an extension of time based on the extended travel authority.

Optionally, during the extended travel time beyond the original service limit, the vehicle control system can implement various processes to ensure that the crew is alert. For example, the vehicle control system can increase the frequency at which the crew members are checked for wakefulness and/or attention. Furthermore, the onboard control unit can optionally reduce the speed of the vehicle system during the extended travel time (relative to the speed prior to the working hours reaching the original service limit).

Only one extended travel authority is shown in FIG. 2, but the vehicle control system may allow the crew to request multiple travel extensions. For example, as the working hours approach the updated service limit, the crew can optionally select the travel extension button again to request another extension to be added onto the updated service limit. In an embodiment, in response to the crew requesting additional extensions, the network management control unit can either deny the requests or grant the requests with conditions. For example, the conditions may include reduced speed limits to reduce the risk of an accident and/or the amount of harm and/or damage in the event of an accident (relative to traveling at faster speeds). Optionally, the allowed upper speed limit may decrease with each successive travel extension until the speed limit reaches a floor speed. The floor speed may represent a lower threshold speed below which is less safe to travel.

In an embodiment, the vehicle control system can make suggestions to the crew regarding operating the vehicle system to avoid exceeding (e.g., violating) the service limit. In a non-limiting example, the vehicle control system can determine one or more suggested stopping locations at which to stop the vehicle system prior to the working hours exceeding the service limit. A suggested stopping location refers to an upcoming location along a route in a direction of travel of the vehicle system. The vehicle system is expected to reach the suggested stopping location prior to the working hours exceeding the service limit. The expected movement of the vehicle system can be based on several factors including a planned path of the vehicle system according to a trip schedule and expected movement characteristics of the vehicle system. The expected movement characteristics can be based on external speed limits, a movement plan that designates tractive settings and brake settings over time or distance, historical information of other vehicle systems traveling along the route, and/or the like. For example, if the amount of time remaining before exceeding the service limit is 30 minutes, the onboard control unit can determine, based on the planned path and expected movement characteristics, a geographic area in which the vehicle system can stop prior to reaching the service limit. The onboard control unit can then analyze a map of the geographic area to determine one or more suggested stopping locations within the geographic area.

The suggested stopping locations can represent locations at which the vehicle system can stop without creating a dangerous condition or unduly interfering with the movement of other vehicles. For example, suggested stopping locations are spaced apart from intersections or crossings between the route traveled by the vehicle system and other routes. If a vehicle system comes to a stop extending across an intersection to wait for a replacement crew, the vehicles along the same route and the vehicles along the intersecting route may be forced to wait as well. The suggested stopping locations may be spaced apart from bridges, switches, interlocks, and other route segments that may pose a dangerous condition or interference with other vehicles. The onboard control unit may search for sidetrack sections, stations, rest areas, parking lots, and the like within the geographic area that represent preferred, safe stopping locations. The sidetrack sections are areas along which a rail vehicle can pull off of a main track to wait, allowing other traffic on the main track to pass by the rail vehicle.

In an embodiment, the onboard control unit may display at least one suggested stopping location on the display device. The suggested stopping location is presented as a suggestion for the crew. For example, a message can be presented that advices the crew to control the vehicle system to move to and stop at the suggested stopping location to wait for a replacement crew, which would avoid violating the service limit and interfering with other traffic. In FIG. 3, the notification message includes a schematic illustration of the vehicle system traveling along the route. The schematic illustration includes a line 318 indicating the route and an icon 320 indicating the vehicle system. The illustration may update to reflect the movement of the vehicle system along the route. The schematic illustration includes a marker 316 along the line that indicates the location of a suggested stopping location. The marker includes the abbreviation "SSL" for suggested stopping location.

Optionally, the operator may select the marker 316 using a touch input on a touchscreen or another user input. In response to the input selecting the marker 316, the onboard control unit may present on the display device details about the suggested stopping location. The details can include more information about the suggested stopping location, such as positional coordinates or an address, a type of stopping location (e.g., a sidetrack or a station), and the like. The details may include navigation instructions for navigating the vehicle system to the suggested stopping location. Optionally, the onboard control unit may present an auto-pilot option. For example, if the operator selects the suggested stopping location with the auto-pilot mode or option, the vehicle system may autonomously travel to and stop at the suggested stopping location without requiring additional manual input. If the operator chooses not to take the advice, the operator can ignore the marker indicating the suggested stopping location or acknowledge and close out the notification message by selecting the acknowledgement button.

Optionally, if the operator fails to take the advice, the onboard control unit may automatically control the vehicle system to travel to and stop at the suggested stopping location, even before the working hours reach the prescribed service limit. For example, the onboard control unit may take control of the vehicle system in response to determining that the working hours are within a designated time window before the prescribed service limit. The designated time window may be one minute, two minutes, five minutes, ten minutes, or the like. For example, once the amount of time remaining (e.g., 212 in FIG. 2) falls below the designated time window, the onboard control unit may automatically control the vehicle system to travel to the suggested stopping location such that the vehicle system stops at the suggested stopping location prior to the working hours reaching the prescribed service limit. The onboard control unit provides a notification message to alert the crew of the actions of the control unit.

Figure 4:
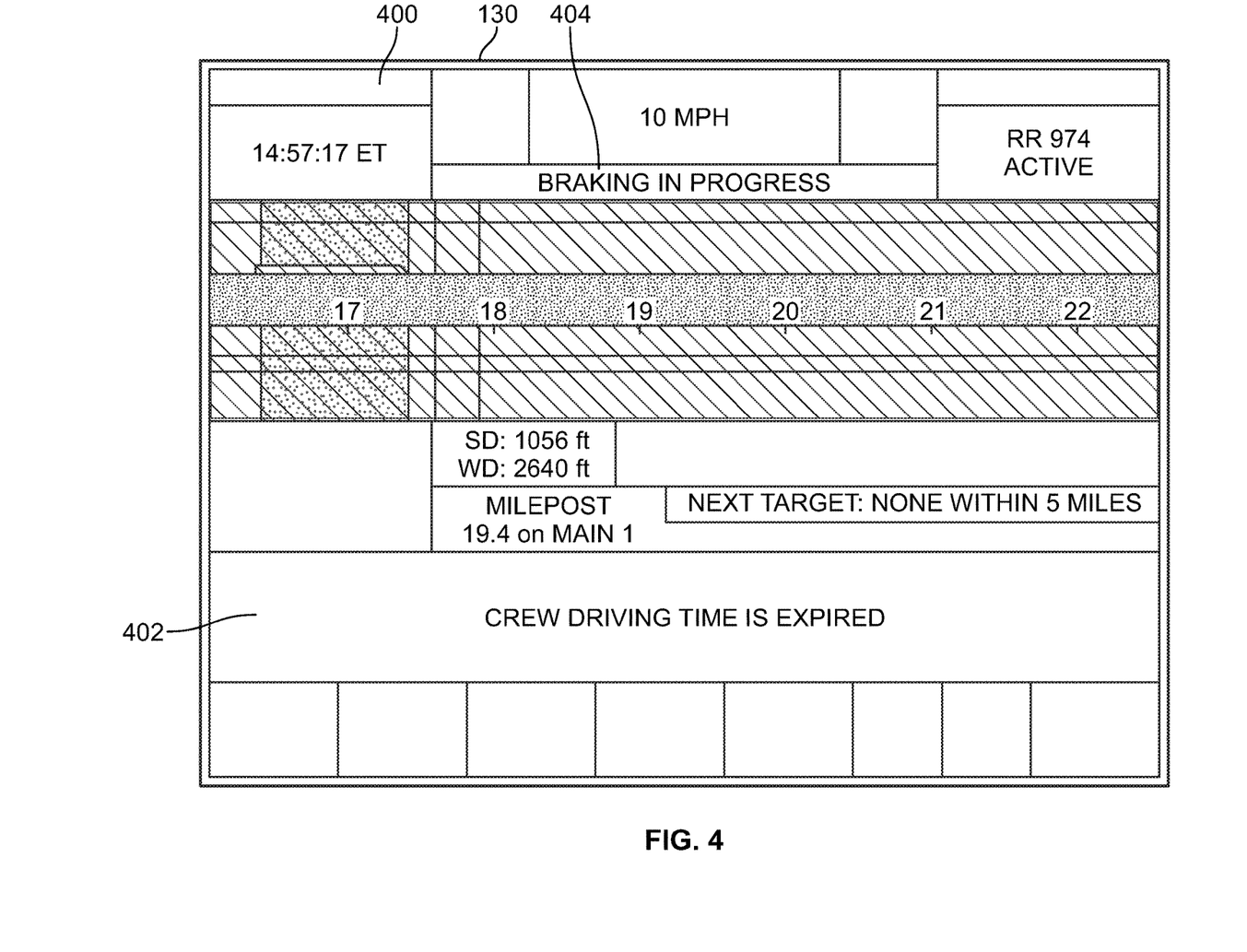
FIG. 4 illustrates a second example notification message on the display device.

In FIG. 2, the working hours reach and exceed the updated service limit (e.g., the extended service limit) at or around time $t_4$. The vehicle control system can continue to display notification messages on the display device up to and beyond the time $t_4$. FIG. 4 shows an example notification message 400 on the display device in response to the working hours reaching the service limit. The notification message provides a text-based message 402 that indicates that the working hours have exceeded the service limit. The message 402 states "Crew Driving Time Is Expired" in the illustrated embodiment. Another text-based status message 404 indicates that the onboard control unit is taking control of the vehicle system and may provide the current action or control operation undertaken by the control unit. The status message 404 states "Braking In Progress" in the illustrated embodiment to notify the crew that the onboard control unit is automatically slowing the vehicle system. The notification message shown in FIG. 4 after the working hours exceed the prescribed service limit can be differentiated from the notification messages shown prior to the working hours reaching the service limit by varying characteristics of the messages, such as colors, energy intensities, size of the font, including different graphics, or the like. For example, the messages may be displayed in red banners in FIG. 4, and the messages in FIG. 3 may be displayed in banners having a different color, such as yellow. Furthermore, the notification message in FIG. 4 can be accompanied by additional stimuli that reinforce the increased severity or urgency of the notification message, such as red lights, flashing lights, a warning audio signal, and the like. In addition to displaying the notification message shown in FIG. 4, the onboard control unit can generate a status message to inform the network management control unit that the crew on the vehicle system has exceeded the prescribed service limit.

The working hours shown in FIG. 2 can represent the working hours of a single crew member in a crew of multiple people. In one embodiment, the working hours are associated with the crew member that has the least amount of time remaining, and therefore is the first crew member to reach the prescribed service limit. For example, the vehicle control system may perform the remedial actions described herein in response to the first crew member exceeding the prescribed service limit. Furthermore, the prescribed service limit may be the first of multiple prescribed service limits that are exceeded. For example, the vehicle control system can track the working hours of each of the crew members with respect to multiple service limits, such as a daily service limit, a weekly service limit, and the like. In an embodiment, the vehicle control system initiates remedial actions as soon as any service limit is exceeded by any of the crew members. Alternatively, the vehicle control system may delay taking the remedial actions until the working hours of all crew members have exceeded a given prescribed service limit. In another alternative embodiment, the vehicle control system initiates remedial actions as soon as a function of the working hours of multiple crew members, such as an average or median of the working hours, exceeds a prescribed service limit.

In an embodiment, the vehicle control system may take one or more remedial actions in response to determining that the working hours exceed the service limit. At least one of the remedial actions involve the onboard control unit seizing control of the vehicle system. For example, the onboard control unit may automatically control the vehicle system to stop movement of the vehicle system, slow movement of the vehicle system (without stopping the vehicle system entirely), and/or prevent movement of the vehicle system from a stationary position. With reference to FIG. 1, the onboard control unit can slow, stop, and/or maintain the vehicle system in the stationary position by controlling the propulsion subsystem to apply the brakes of the vehicle system. The onboard control unit can control the propulsion subsystem by communicating control signals directly to the propulsion subsystem or indirectly via the vehicle controller.

A purpose for the onboard control unit automatically controlling the vehicle system is to safely bring the vehicle system to a stop to enable a crew change. In an embodiment, the onboard control unit slows the vehicle system to a stop and maintains the vehicle system in the stationary position until the replacement crew has arrived and logged in to commence operating the vehicle system. Optionally, if the control unit determines that immediately stopping the vehicle system would cause the vehicle system to interfere with other traffic or result in a dangerous condition, the control unit can slow the vehicle system without immediately stopping the vehicle system. The vehicle system can travel at a reduced speed to a more preferable stopping location, such as to avoid stopping across an intersection or on a bridge.

The onboard control unit can automatically control the vehicle system to travel to and stop at a suggested stopping location that is determined by the onboard control unit. The suggested stopping location can be similar to the suggested stopping location shown in the notification message in FIG. 3, except that the vehicle system arrives at the suggested stopping location after the working hours exceed the prescribed service limit. For example, in response to determining that the service limit is exceeded, the onboard control unit may analyze the surrounding geographic area and determine a safe stopping location for the vehicle system. Then, the onboard control unit automatically controls the vehicle system to move to and stop at the safe stopping location.

In an alternative embodiment, upon determining that the prescribed service limit is exceeded, the onboard control unit may impose a speed limit on the vehicle system and allow for the crew to continue controlling the movement of the vehicle system at speeds below the speed limit. The crew can select a preferred location at which to stop the vehicle system. The speed limit can be selected to reduce the potential of damage and/or injury that may be attributable to fatigue or drowsiness of the crew. For example, the speed limit may be 5 or 10 miles per hour. The speed limit may vary with the amount of time in excess of the prescribed service limit. For example, as the elapsed time beyond the service limit aggregates, the control unit can gradually reduce the speed limit until eventually stopping the vehicle system completely.

The vehicle system may have an manual override mechanism that enables the crew to exert control over the vehicle system. For example, although the onboard control unit may automatically control the propulsion subsystem to apply the brakes in response to determining that the working hours exceed the service limit, the crew can have the ability to overcome or cancel the control actions taken by the control unit. In an embodiment, if the crew utilizes the manual override mechanism to release the brakes and continue operating the vehicle system along the route, the onboard control unit can record the details of the manual override and generate a status signal for notifying the network management control unit.

Figure 5:
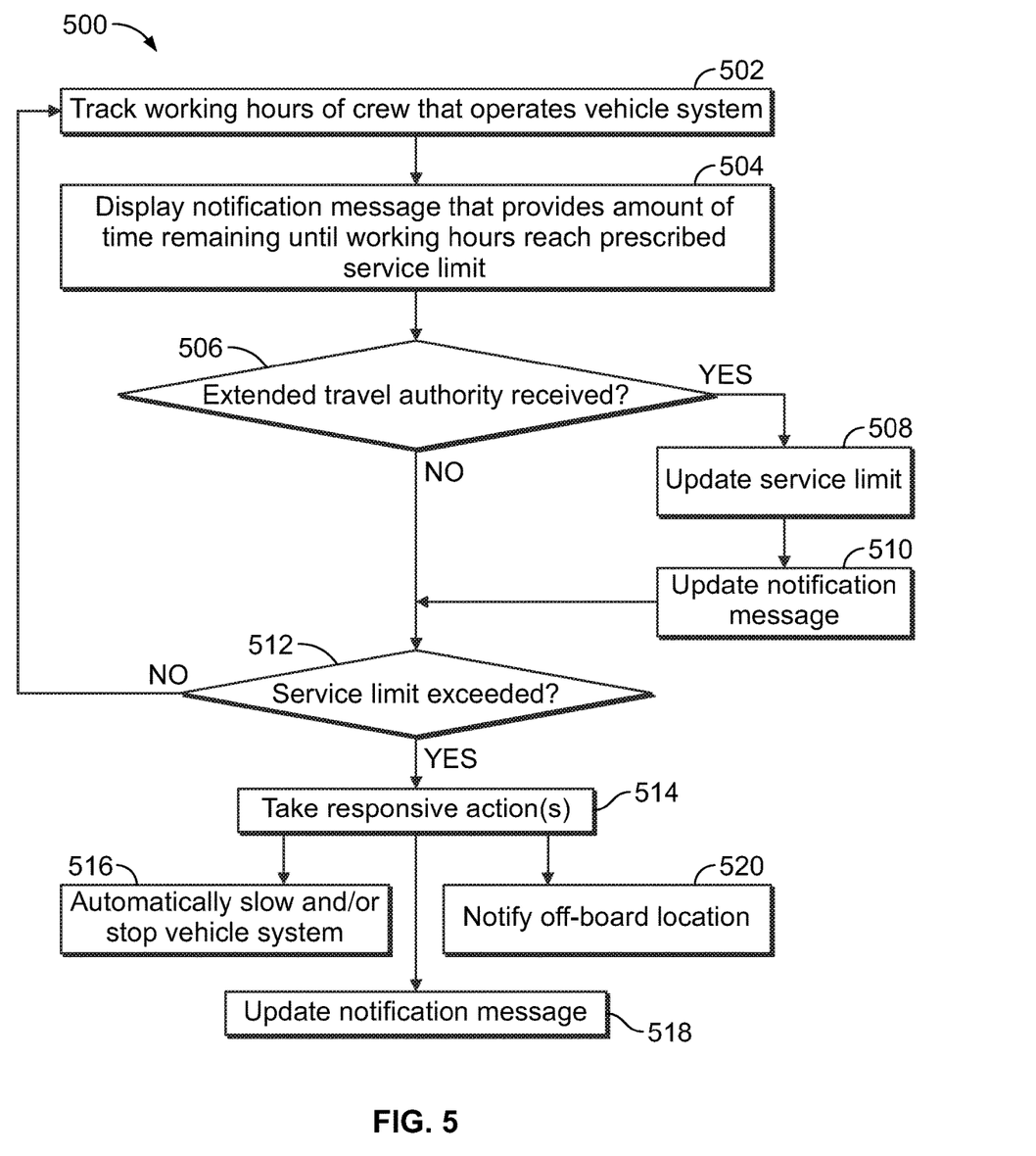
FIG. 5 illustrates a flowchart of one example of a method for controlling a vehicle system.

FIG. 5 illustrates a flowchart of one example of a method 500 for monitoring crew working hours and enforcing service limits. The method can represent operations performed by the vehicle control system described above. At 502, working hours of one or more members of a crew that operates a vehicle system are tracked. For example, the working hours may represent time spent by the crew controlling the movement of the vehicle system as the vehicle system travels on a route. The working hours accumulate as the vehicle system travels under the control of the crew. The working hours can be tracked receiving previously-accrued working hours of the crew, determining a time that the crew commences operation of the vehicle system, and adding the previously-accrued working hours to an amount of time elapsed from the time that the crew commenced operation.

At 504, a notification message is displayed that is an indicator of an amount of time remaining until the working hours reach one or more prescribed service limits. Each prescribed service limit may be associated with a designated time interval, such as 24 hours. The notification message may notify the crew of the amount of time remaining before the crew needs to be replaced. The notification message may be displayed on a display device onboard the vehicle system.

At 506, a determination is made as to whether an extended travel authority is received. The extended travel authority can be received from an off-board location, such as a network management control unit at a dispatch facility. The receipt of the extended travel authority may be responsive to the crew initiating a request for extended travel beyond the prescribed service limit. If the extended travel authority is received, then flow of the method can proceed toward 508. If the extended travel authority is not received (e.g., a request for extended travel is denied), the method can proceed directly toward 512.

At 508, the service limit is updated by extending the service limit a designated time period (e.g., 5 minutes, 10 minutes, or the like) beyond the prescribed service limit. The designated time period may be provided in the extended travel authority. At 510, the notification message is updated to reflect the updated service limit. For example, the notification message may indicate an amount of time remaining until the working hours reach the updated service limit. The notification message optionally may visually display an indication that an extended travel authority has been received.

At 512, a determination is made as to whether the service limit in force has been exceeded by the working hours of the crew. The service limit in force may be the prescribed service limit or the updated service limit, depending on the resolution of the determination at 506. If the service limit in force has been exceeded, then flow of the method can proceed toward 514. If the service limit is not exceeded, then flow can return toward 502 to continue tracking the working hours of the crew.

At 514, one or more responsive actions are taken in response to determining that the working hours exceed the service limit. For example, at 516, the vehicle may be automatically controlled to slow and/or stop. If stopped, the vehicle may be automatically controlled to remain stationary until a replacement crew arrives and commences operation of the vehicle system. At 518, a notification message is displayed onboard the vehicle system to notify the crew that the service limit is exceeded and remedial or responsive actions have been initiated. At 520, the off-board location is notified that the service limit is exceeded by the crew on the vehicle system.

In one embodiment, a system (e.g., a vehicle control system) is provided that includes one or more processors that may track working hours of one or more members of a crew that operates a vehicle system. The working hours accumulate as the vehicle system travels on a route. The one or more processors may direct a display device to present a notification message that indicates an amount of time remaining until the working hours reach a prescribed service limit for a designated time interval. The one or more processors may automatically control the vehicle system to one or more of stop movement of the vehicle system, slow movement of the vehicle system, or prevent movement of the vehicle system from a stationary position responsive to determining that the working hours of the crew exceed the prescribed service limit.

Optionally, the prescribed service limit for the designated time interval is a daily service limit or a weekly service limit. Optionally, the one or more processors may determine a suggested stopping location at which to stop the vehicle system prior to the working hours reaching the prescribed service limit. The one or more processors direct the display device to present the suggested stopping location. Optionally, the one or more processors may control the vehicle system to travel to and stop at a suggested stopping location responsive to determining that the working hours of the crew exceed the prescribed service limit. Optionally, responsive to receiving an extended travel authority from an offboard location, the one or more processors may delay automatically controlling the vehicle system for a designated time period beyond a time that the working hours reach the prescribed service limit.

Optionally, responsive to receiving an extended travel authority from an offboard location, the one or more processors may update the notification message that is displayed to reflect that the extended travel authority is received and to indicate an amount of time remaining until the working hours reach an updated service limit. The updated service limit represents a designated time period beyond the prescribed service limit, and the designated time period is provided in the extended travel authority.

Optionally, the system includes a communication device disposed onboard the vehicle system and operably coupled to the one or more processors. The one or more processors may control the communication device to communicate the working hours of the crew and/or the amount of time remaining until the working hours reach the prescribed service limit to an offboard location. Optionally, the one or more processors may track the working hours of the crew by receiving previously-accrued working hours of the crew, determining a time that the crew commences operation of the vehicle system, and adding the previously-accrued working hours to an amount of time elapsed from the time that the crew commenced operation. Optionally, the system includes a communication device and an input device both disposed onboard the vehicle system and operably coupled to the one or more processors. Responsive to receiving a request for extended travel via the input device, the one or more processors may control the communication device to communicate a request message that includes the request for extended travel to an offboard location.

Optionally, the one or more processors may automatically control the vehicle system by controlling a propulsion subsystem of the vehicle system to apply brakes of the vehicle system for one or more of stopping movement of the vehicle system, slowing movement of the vehicle system, or preventing movement of the vehicle system.

In one embodiment, a method (e.g., for monitoring crew hours) is provided that includes tracking working hours of one or more members of a crew that operates a vehicle system. The working hours accumulate as the vehicle system travels on a route. The method includes displaying, on a display device, a notification message that indicates an amount of time remaining until the working hours reach a prescribed service limit for a designated time interval. The method includes automatically controlling the vehicle system to one or more of stop movement of the vehicle system, slow movement of the vehicle system, or prevent movement of the vehicle system from a stationary position responsive to determining that the working hours of the crew exceed the prescribed service limit. Optionally, the method includes determining a suggested stopping location at which to stop the vehicle system prior to the working hours reaching the prescribed service limit and displaying the suggested stopping location on the display device.

Optionally, automatically controlling the vehicle system includes controlling the vehicle system to travel to and stop at a suggested stopping location. Optionally, the method includes delaying the automatic control of the vehicle system for a designated time period beyond a time that the working hours reach the prescribed service limit responsive to receiving an extended travel authority from an offboard location. Optionally, the method includes updating the notification message that is displayed responsive to receiving an extended travel authority from an offboard location. The notification message is updated to reflect that the extended travel authority is received and to indicate an amount of time remaining until the working hours reach an updated service limit. The updated service limit represents a designated time period beyond the prescribed service limit, and the designated time period is provided in the extended travel authority.

Optionally, the method may include communicating the working hours of the crew and/or the amount of time remaining until the working hours reach the prescribed service limit to an offboard location. Optionally, tracking the working hours of the crew includes receiving previously-accrued working hours of the crew, determining a time that the crew commences operation of the vehicle system, and adding the previously-accrued working hours to an amount of time elapsed from the time that the crew commenced operation.

Optionally, the method includes communicating a request message to an offboard location responsive to receiving a request for extended travel via an input device. The request message includes the request for extended travel. In one embodiment, a system (e.g., a vehicle control system) is provided that includes one or more processors that may to track working hours of one or more members of a crew that operates the vehicle system. The working hours accumulate as the vehicle system travels on a route. The one or more processors may direct a display device to present a notification message that indicates an amount of time remaining until the working hours reach a prescribed service limit for a designated time interval. The one or more processors may determine a suggested stopping location at which to stop the vehicle system and to direct the display device to present the suggested stopping location. The suggested stopping location is an upcoming location along the route in a direction of travel of the vehicle system, and the vehicle system is expected to reach the suggested stopping location prior to the working hours exceeding the prescribed service limit. The suggested stopping location is spaced apart from intersections between the route and other routes. Optionally, the one or more processors may automatically control the vehicle system to travel to and stop at the suggested stopping location responsive to determining that the working hours of the crew are within a designated time window before the prescribed service limit.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors configured to track working hours of one or more members of a crew that operates a vehicle system, wherein the working hours accumulate as the vehicle system travels on a route, the one or more processors being further configured to direct a display device to present a notification message that indicates an amount of time remaining until the working hours reach a prescribed service limit for a designated time interval, and
the one or more processors are further configured to control the vehicle system to one or more of stop movement of the vehicle system, slow movement of the vehicle system, or prevent movement of the vehicle system from a stationary position responsive to determining that the working hours of the one or more members of the crew exceed the prescribed service limit.

2. The system of claim 1, wherein the one or more processors are configured to automatically control the vehicle system by controlling a propulsion subsystem of the vehicle system to apply brakes of the vehicle system for one or more of stopping movement of the vehicle system, slowing movement of the vehicle system, or preventing movement of the vehicle system.

3. The system of claim 1, wherein the one or more processors are configured to determine a suggested stopping location at which to stop the vehicle system prior to the working hours reaching the prescribed service limit, and the one or more processors direct the display device to present the suggested stopping location.

4. The system of claim 1, wherein the one or more processors are configured to control the vehicle system to travel to and stop at a suggested stopping location responsive to determining that the working hours of the one or more members of the crew exceed the prescribed service limit.

5. The system of claim 1, wherein, responsive to receiving an extended travel authority from an offboard location, the one or more processors are configured to delay controlling the vehicle system for a designated time period beyond a time that the working hours reach the prescribed service limit.

6. The system of claim 1, wherein, responsive to receiving an extended travel authority from an offboard location, the one or more processors are configured to update the notification message that is displayed to reflect that the extended travel authority is received and to provide an amount of time remaining until the working hours reach an updated service limit, wherein the updated service limit represents a designated time period beyond the prescribed service limit, the designated time period provided in the extended travel authority.

7. The system of claim 1, further comprising a communication device disposed onboard the vehicle system and operably coupled to the one or more processors, and wherein the one or more processors are configured to control the communication device to communicate one or both of the working hours of the one or more members of the crew or the amount of time remaining until the working hours reach the prescribed service limit to an offboard location.

8. The system of claim 1, wherein the one or more processors are configured to track the working hours of the one or more members of the crew by receiving previously-accrued working hours of the one or more members of the crew, determining a time that the one or more members of the crew commenced operation of the vehicle system, and adding the previously-accrued working hours to an amount of time elapsed from the time that the one or more members of the crew commenced operation.

9. The system of claim 1, further comprising a communication device and an input device both disposed onboard the vehicle system and operably coupled to the one or more processors, and wherein, responsive to receiving a request for extended travel via the input device, the one or more processors are configured to control the communication device to communicate a request message that includes the request for extended travel to an offboard location.

10. The system of claim 1, wherein the prescribed service limit for the designated time interval is one of a daily service limit or a weekly service limit.

11. The system of claim 1, wherein, responsive to determining that the working hours of the one or more members of the crew exceed the prescribed service limit as the vehicle system is moving on the route, the one or more processors are configured to control the vehicle system to one or more of stop the movement of the vehicle system or slow the movement of the vehicle system.

12. A method comprising:
tracking working hours of one or more members of a crew that operates a vehicle system, and the working hours accumulate as the vehicle system travels on a route;
displaying, on a display device, a notification message that indicates an amount of time remaining until the working hours reach a prescribed service limit for a designated time interval; and
controlling the vehicle system responsive to determining that the working hours of the one or more members of the crew exceed the prescribed service limit to one or more of:
stop movement of the vehicle system,
slow movement of the vehicle system, or
prevent movement of the vehicle system from a stationary position.

13. The method of claim 12, further comprising determining a suggested stopping location at which to stop the vehicle system prior to the working hours reaching the prescribed service limit, and
displaying the suggested stopping location on the display device.

14. The method of claim 12, wherein controlling the vehicle system includes automatically controlling the vehicle system to travel to and stop at a suggested stopping location.

15. The method of claim 12, further comprising delaying the control of the vehicle system for a designated time period beyond a time that the working hours reach the prescribed service limit responsive to receiving an extended travel authority from an offboard location.

16. The method of claim 12, further comprising updating the notification message that is displayed responsive to receiving an extended travel authority from an offboard location to reflect that the extended travel authority is received and to provide an amount of time remaining until the working hours reach an updated service limit, wherein the updated service limit represents a designated time period beyond the prescribed service limit, the designated time period provided in the extended travel authority.

17. The method of claim 12, wherein tracking the working hours of the one or more members of the crew includes receiving previously-accrued working hours of the crew, determining a time that the one or more members of the crew commenced operation of the vehicle system, and adding the previously-accrued working hours to an amount of time elapsed from the time that the one or more members of the crew commenced operation.

18. The method of claim 12, further comprising communicating a request message to an offboard location responsive to receiving a request for extended travel via an input device, the request message including the request for extended travel.

19. A system comprising:
one or more processors configured to track working hours of one or more members of a crew that operates the vehicle system, wherein the working hours accumulate as the vehicle system travels on a route, the one or more processors configured to direct a display device to present a notification message that provides an amount of time remaining until the working hours reach a prescribed service limit for a designated time interval, the one or more processors also configured to determine a suggested stopping location at which to stop the vehicle system and to direct the display device to present the suggested stopping location, and
the suggested stopping location is an upcoming location along the route in a direction of travel of the vehicle system, and the vehicle system is expected to reach the suggested stopping location prior to the working hours exceeding the prescribed service limit, wherein the suggested stopping location is spaced apart from intersections between the route and other routes.

20. The system of claim 19, wherein the one or more processors are configured to automatically control the vehicle system to travel to and stop at the suggested stopping location responsive to determining that the working hours of the one or more members of the crew are within a designated time window before the prescribed service limit.

* * * * *